United States Patent [19]

Wakatsuki

[11] Patent Number: 5,207,134
[45] Date of Patent: May 4, 1993

[54] AUTOMATIC PRECISION LATHE

[75] Inventor: Hidetsugu Wakatsuki, Nagaoka, Japan

[73] Assignee: Tsugami Corporation, Tokyo, Japan

[21] Appl. No.: 824,257

[22] Filed: Jan. 21, 1992

[30] Foreign Application Priority Data

Jan. 21, 1991 [JP] Japan .................................. 3-19271

[51] Int. Cl.⁵ .............................................. B23B 3/30
[52] U.S. Cl. ......................................... 82/129; 29/55; 82/124
[58] Field of Search ................. 82/129, 142, 124, 127, 82/120; 29/276, 51, 53-55

[56] References Cited

U.S. PATENT DOCUMENTS

| 3,587,369 | 6/1971 | Reiners et al. | 82/124 |
| 4,683,786 | 8/1987 | Kersten et al. | 82/118 |
| 4,719,676 | 1/1988 | Sansone | 82/129 |
| 4,964,320 | 10/1990 | Lee, Jr. | 82/127 |
| 4,982,634 | 1/1991 | Nagel et al. | 29/51 |
| 4,987,807 | 1/1991 | Simon | 82/129 |
| 5,029,499 | 7/1991 | Okitsu | 82/127 |

FOREIGN PATENT DOCUMENTS

| 371450 | 6/1990 | European Pat. Off. | 82/124 |
| 149103 | 9/1982 | Japan | 82/124 |
| 192701 | 11/1983 | Japan | 82/124 |
| 1565587 | 5/1990 | U.S.S.R. | 82/120 |

Primary Examiner—Z. R. Bilinsky
Attorney, Agent, or Firm—Nixon & Vanderhye

[57] ABSTRACT

An automatic precision lathe is provided with a rotating main spindle movable in its axial directions, a slide movable in directions perpendicular to the axial directions of the main spindle, and a first subspindle and a second subspindle provided on the surface of the slide which faces the main spindle. The first and the second spindle are moved together with the slide to be alternately aligned with the main spindle to held the tip portion and the largest intermediate portion of the workpiece, respectively. The automatic precision lathe machines a workpiece having an intermediate portion with the largest diameter very accurately at a high rotational speed and at a large feed.

8 Claims, 2 Drawing Sheets

AUTOMATIC PRECISION LATHE

BACKGROUND OF THE INVENTION

1. Field of the Invention

This invention relates to an automatic precision lathe of a movable main spindle type for cutting a long workpiece such as a long shaft.

2. Description of the Related Art

Many shafts have an intermediate portion with the largest diameter. As the cutting operation of a workpiece of this type is continued on the conventional automatic lathe known as a Swiss type automatic lathe, the portion of the workpiece which is being cut has become remoter and remoter from the main spindle which holds the workpiece. If the workpiece is cut at the same rotational speed and at the same feed, the remoter portion which is being cut is bent more largely. In order to avoid this disadvantage, the remoter portion must be cut at a lower rotational speed and/or at a smaller feed, resulting in poor productivity. Further, the workpiece requires a long held portion in order to be securely held by the chunk of the main spindle and this portion must be cut off after the working of the workpiece is completed, with the result that a relative large length of material is wasted.

With the conventional automatic machine provided with workpiece holding means such as a workpiece supporting device or a subspindle in front of the main spindle, the means is adapted to pass the machined portion of the workpiece. Thus, the means must have a hole with an inner diameter equal to the outer diameter of the largest portion of the workpiece and the portions of the workpiece which have smaller diameters cannot be securely held by this holding means, thereby largely bending the workpiece bent during the cutting operation.

SUMMARY OF THE INVENTION

The object of this invention is to provide an automatic precision lathe in which the tip portion of a workpiece is held by a first subspindle to cut the forward portion and the largest diameter intermediate portion of the workpiece and then the intermediate portion of the workpiece is held by a second subspindle to cut the rear portion of the workpiece, thereby machining the workpiece highly accurately at a high speed and at a large feed without bending of the workpiece.

In order to attain this object, an automatic precision lathe according to this invention comprises a rotating main spindle movable in its axial directions, a slide movable in directions perpendicular to the axial directions of main spindle, and a first subspindle and a second subspindle provided on the surface of the slide which faces the main spindle. The first and the second spindle are moved together with the slide to be alternately aligned with the main spindle to held the tip portion and the largest intermediate portion of the workpiece, respectively.

First, the tip portion of the workpiece held by the main spindle is machined and then the tip portion is chucked by the first subspindle. The forward portion of the workpiece which has a smaller diameter and the intermediate portion of the workpiece which has the largest diameter are machined in this state. Thereafter, the workpiece is released from the first subspindle and the machined intermediate portion of the workpiece is chucked by the second subspindle. Then, the rear portion of the workpiece is machined to complete the machining of the workpiece.

In this way, the workpiece can be machined highly accurately at a constant high speed and at a constant feed without bending of the workpiece and with few waste of material of the workpiece.

BRIEF DESCRIPTION OF THE DRAWINGS

This invention will be fully understood from the following detailed description by way of the preferred embodiment with reference to the accompanying drawings in which.

DETAILED DESCRIPTION OF THE PREFERRED EMBODIMENT

Figure 1:
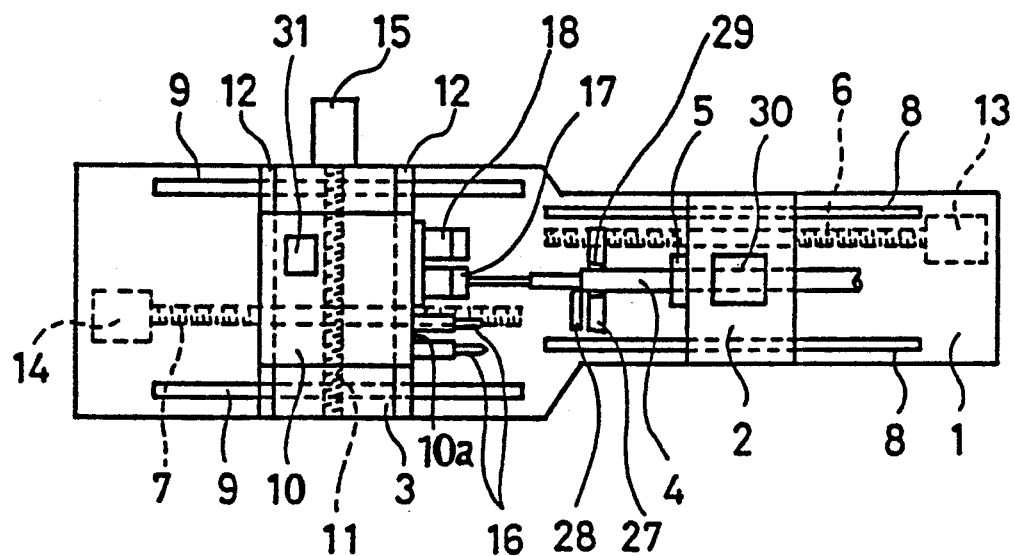
FIG. 1 is a plan view of one embodiment of an automatic precision lathe according to this invention.
Figure 2:
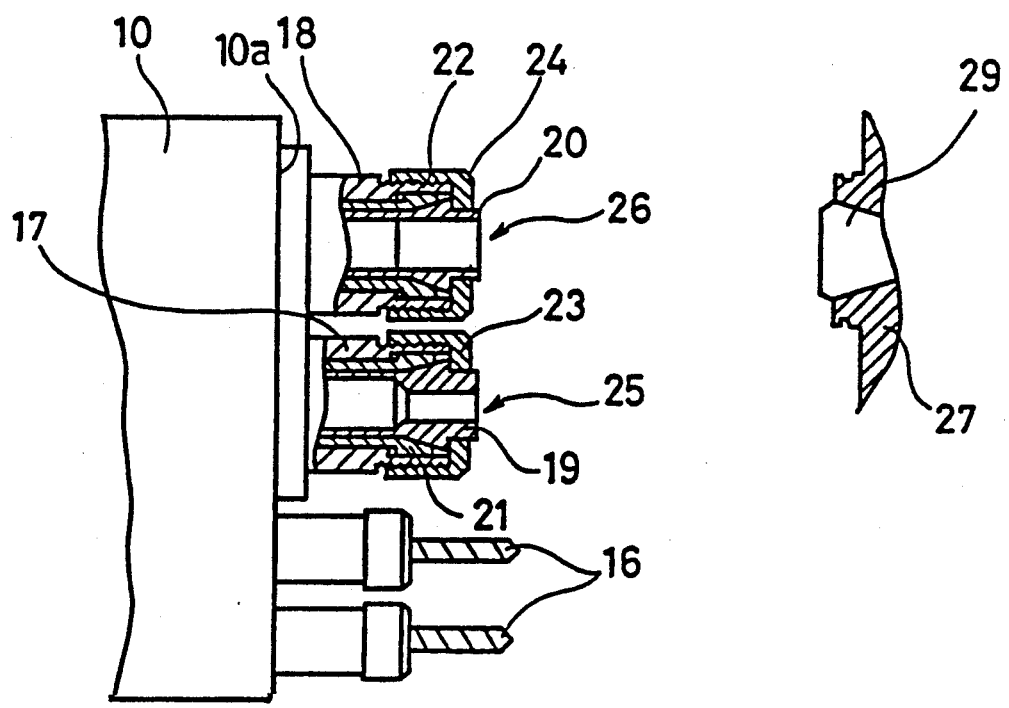
FIG. 2 is a plan view of the main portions of the automatic precision lathe.

With reference to FIGS. 1 and 2, a main headstock 2 and a longitudinally movable slide 3 are mounted on the upper surface of the bed 1 of an automatic precision lathe according to one embodiment of this invention so that they slide in Z directions (in the lengthwise directions of the bed 1 or in the axial directions of a main spindle as described later).

The main headstock 2 extends in the lengthwise direction of the bed 1 and has a main spindle 5 provided with a conventional collet chuck for holding a long workpiece 4 such as a long shaft. The main headstock 2 and the longitudinally movable slide 3 are guided by guideways 8 and 9 provided on the bed 1 and can reciprocate in the Z directions by means of feed screws 6 and 7 mounted in the bed 1, respectively.

A cross slide 10 can reciprocate in X directions (in directions perpendicular to the Z directions) along guideways 12 provided on the longitudinally movable slide 3 by means of a feed screw 11 mounted in the longitudinally movable slide 3. The feed screws 6, 7 and 11 are driven by electric motors 13, 14 and 15 which cooperate with each other by means of an electric or electronic device (not shown).

The cross slide 10 is provided with a tools 16 for forming a holes, a first subspindle 17 and a second subspindle 18 whose axes are arranged parallel with the Z directions and provided on a surface 10a of the cross slide 10 facing the main spindle 5.

The first and second subspindles 17 and 18 have the same structure and their axes are at the same level as the axis of the main spindle 5. These subspindles have conventional collet chucks 25 and 26 comprising collets 19 and 20, chuck sleeves 21and 22 fitted at their tapered portions with the tapered portions of the collets 19 and 20 and collet nuts 23 and 24. The workpiece 4 is selectively held by the subspindles 17 and 18 or detached therefrom by closing and opening the collet chucks 25 and 26. The inner diameter of the collet 19 of the first subspindle 17 is rendered equal to the outer diameter of the machined tip portion of the workpiece 4, and the inner diameter of the collet 20 of the second subspindle 18 is made equal to the machined intermediate portion of the workpiece 4.

A guide bush holder 27 is fixedly disposed close to the main spindle 5 on the bed 1 and is provided with a guide bush 29 having a hole coaxial with the main spindle 5 and slidably holding the portion of the workpiece 4 which is not yet machined. Electric motors 30 and 31 synchronously rotate the main spindle 5 and the first and second subspindles 17 and 18.

A cutter 28 is moved in the X direction by means of a driving device (not shown) to be fed toward the workpiece 4 to form the outer diameter of the workpiece 4.

The operation of the automatic precision lathe will be explained with reference to FIGS. 1, 3 and 4.

First, the workpiece 4 is held by the chuck of the main spindle 5 and rotated together with the main spindle 5 at a predetermined rotational speed by means of the electric motor 30. At the same time, the workpiece 4 is moved together with the main spindle 5 through the feed screw 6 in the direction A in FIG. 3 by means of the electric motor 13 so that the tip portion of the workpiece 4 begins to project from the guide bush 29.

The cutter 28 is moved in the X direction to be fed into the workpiece 4 to a predetermined amount and forms the outer diameter of the workpiece 4. When the tip portion 4a of the workpiece 4 which has a smaller diameter is machined by such a length as can be held by the collet chuck 25 of the first subspindle 17, the cutter 28 is retracted and the rotation and feeding of the main spindle 5 are stopped.

Next, the cross slide 10 is moved by means of the electric motor 15 to align the first subspindle 17 with the main spindle 5. The chuck sleeve 21 is retracted to open the collet 19 and the subspindle 17 is moved toward the guide bush 29 through the feed screw 7 and the cross slide 10 by means of the electric motor 14 in such a way that the tip portion 4a of the workpiece 4 which constitutes a held portion is inserted in the collet 19. Then, the chuck sleeve 21 is advanced to close the collet 19, whereby the tip portion 4a of the workpiece 4 is held by the first subspindle 17.

Figure 3:
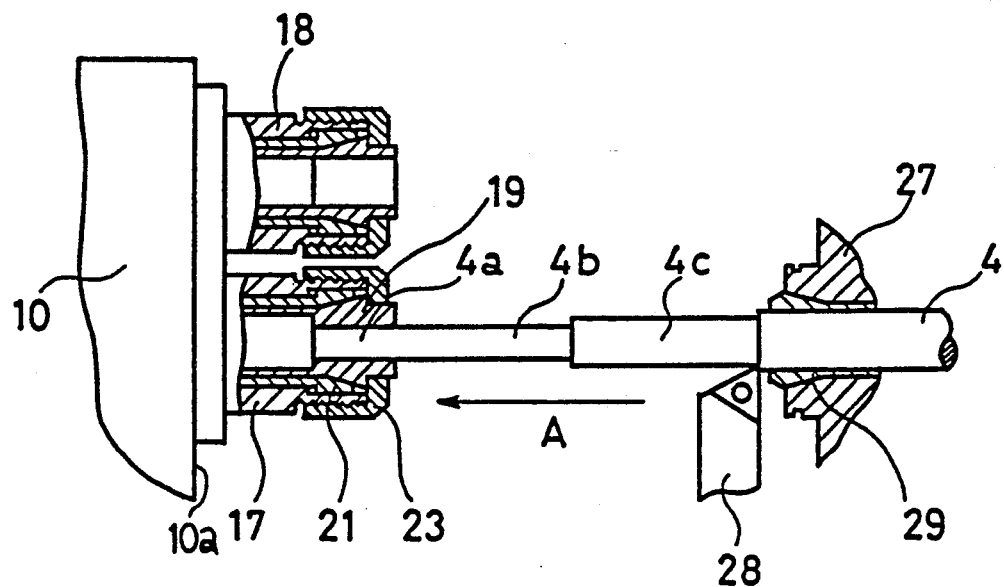
FIG. 3 is a plan view of the main portions of the automatic precision lathe in which the largest diameter intermediate portion of a workpiece is being cut in a state in which the tip portion of the workpiece is chucked by a first subspindle.
Figure 4:
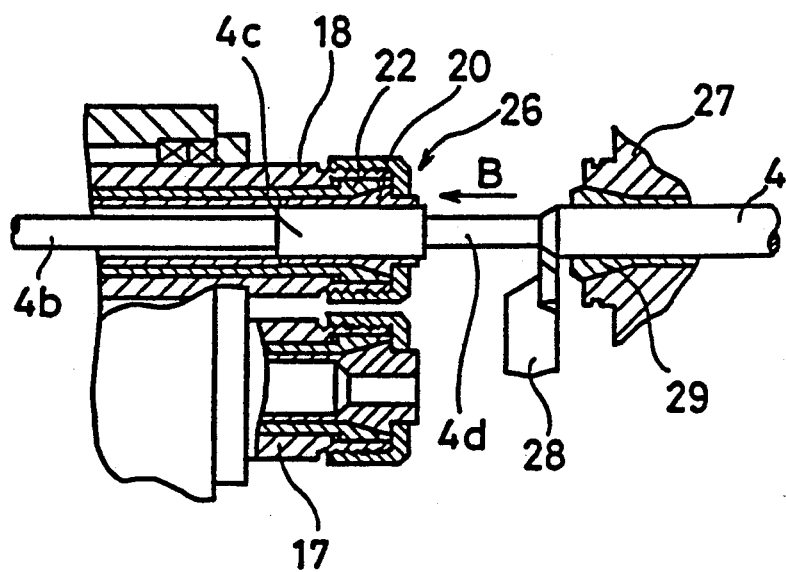
FIG. 4 is a plan view of the main portion of the automatic precision lathe in which the rear end portion of the workpiece is being cut in a state in which the intermediate portion of the workpiece is chucked by a second subspindle.

Thereafter, the main spindle 5 and the first subspindle 17 are synchronously rotated at a predetermined rotational speed together with the workpiece 4 by means of the electric motors 30 and 31, and simultaneously fed in the A direction in FIG. 3 by means of the motors 13 and 14 at the same predetermined speed. The forward end portion 4b of the workpiece 4 which has a smaller diameter is cut-formed in a state in which the tip portion 4a of the workpiece 4 is held by the first subspindle 17. In succession, the cutter 28 is retracted by a predetermined amount and an intermediate portion 4c of the workpiece 4 which has the largest diameter is formed by the cutter 28.

When the machining of the intermediate portion 4c of the work piece 4 is completed, the rotation and feeding of the main spindle 5 and the subspindle 17 are stopped, the chuck sleeve 21 of the collect chuck 25 of the first subspindle 17 is retracted and the collet 19 is opened to release the tip portion 4a of the workpiece 4. Then, the cross slide 10 as well as the longitudinally movable slide 10 is retracted so that the workpiece 4 is completely removed from the first spindle 17.

After this step has been carried out, the cross slide 10 is moved in the X direction by means of the electric motor 15 to align the second subspindle 18 with the main spindle 5. The chuck sleeve 22 of the second subspindle 18 is retracted thereby to open the collet 20. The longitudinally movable slide 3 and the cross slide 10 are moved toward the guide bush 29 in the same manner as in the operation of the first subspindle 17, the intermediate portion 4c of the workpiece 4 is held by the collet 20 and the chuck sleeve 22 is advanced forward to hold the intermediate portion 4c of the workpiece 4.

Thereafter, the main spindle 5 and the second subspindle 18 are synchronously rotated together with the workpiece 4 by means of the electric motors 30 and 31 under the same condition as in the operation of the first subspindle 17 and are moved in the direction B (in the same direction as the direction A in FIG. 3) at the same speed by means of the electric motors 13 and 14 until the machining of the rear portion 4d of the workpiece 4 is completed. Upon machining the rear portion 4d, the cutter 28 is fed to the workpiece 4 by a predetermined amount by means of a driving device (not shown).

The workpiece 4 is released from the second subspindle 18 in the same way as in the operation of the first subspindle 17, the description thereof being omitted. Then, the machining of a workpiece 4 is completed.

In case the forward held portion or the tip portion 4a of the workpiece 4 is machined, little bending occurs to the workpiece 4 although the tip portion 4a is not held, because the tip portion 4b is very short and is disposed very close to the guide bush 29. Upon machining the forward end portion 4b and the intermediate portion 4c, the tip portion 4a is held by the first subspindle 17 so as to shorten the machining length of the workpiece 4. Thus, the workpiece 4 is hardly bent. On the other hand, the intermediate portion 4c is held by the second subspindle 18 for machining the rear end portion 4d so as to lessen the working length of the workpiece 4 whereby the workpiece 4 is also hardly bent. As a result, the workpiece 4 is machined very accurately at a high speed and at a large feed.

The provision of the chucking devices on the subspindles 17 and 18 which have a different structure from the conventional workpiece holding devices allows the workpiece 4 to be rotated by both the main spindle 5 and the corresponding subspindles 17 and 18. Therefore, a heavy cut of the workpiece 4 can be performed. The subspindles 17 and 18 may be provided with mechanisms for back-working a workpiece 4.

What is claimed is:

1. An automatic precision lathe comprising:
   a bed;
   a main spindle having an axis and movable in two opposed axial directions thereof, for holding a long workpiece having a tip portion, a rear end portion and an intermediate portion between said tip portion and said rear end portion, said intermediate portion having a larger diameter than said tip portion and said rear end portion after said tip portion, said rear end poriton and said intermediate portion have been machined;
   first driving means for rotating said main spindle;
   second driving means for moving said main spindle in said axial directions;
   a cross slide movable in two opposed crosswise directions perpendicular to said axial directions of said main spindle, said cross slide having a surface facing said main spindle;
   third driving means for moving said cross slide in said crosswise directions;

a first subspindle and a second subspindle having axes parallel with one another and parallel with the axis of said main spindle, said first subspindle and said second subspindle projecting from said surface of said cross slide and movable together with said cross slide in said crosswise directions so as to be alternately axially aligned with said main spindle;

a first chuck provided on said first subspindle, for holding said tip portion of said workpiece, when said first subspindle is axially aligned with said main spindle and the intermediate portion of said workpiece is being worked; and a second chuck provided on said second subspindle, for holding said intermediate portion of said workpiece, when said second subspindle is axially aligned with said main spindle and the rear end portion of said workpiece is being worked.

2. The automatic precision lathe according to claim 1, further comprising fourth and fifth driving means for rotating said first and second subspindles in synchronism with rotation of said main spindle.

3. The automatic precision lathe according to claim 2, wherein each of said first, fourth and fifth driving means comprises an electric motor, and each of said second and third driving means comprises a feed screw for moving each of said main spindle and said cross slide and an electric motor for rotating said feed screw.

4. The automatic precision lathe according to claim 1, wherein said first driving means comprises an electric motor and each of said second and third driving means comprises a feed screw for moving each of said main spindle and said cross slide and an electric motor for rotating said feed screw.

5. The automatic precision lathe according to claim 1, further comprising a longitudinally movable slide mounted on said bed and movable in said axial directions and sixth driving means for moving said longitudinally movable slide in said axial directions, and wherein said cross slide is mounted on said longitudinally movable slide so as to be moved in said crosswise directions by means of said third driving means.

6. The automatic precision lathe according to claim 5, wherein said first driving means comprises an electric motor and each of said second, third and sixth driving means comprises a feed screw for moving each of said main spindle and said cross slide and an electric motor for rotating said feed screw.

7. The automatic precision lathe according to claim 1 further comprising a guide bush on said bed between said main spindle and said cross slide for guiding said workpiece.

8. The automatic precision lathe according to claim 1, wherein each of said first and second subspindles is provided with a mechanism for back-machining said workpiece.

* * * * *